US009286337B2

(12) United States Patent
Kodali et al.

(10) Patent No.: US 9,286,337 B2
(45) Date of Patent: Mar. 15, 2016

(54) SYSTEM AND METHOD FOR SUPPORTING HETEROGENEOUS SOLUTIONS AND MANAGEMENT WITH AN ENTERPRISE CRAWL AND SEARCH FRAMEWORK

(71) Applicant: Oracle International Corporation, Redwood Shores, CA (US)

(72) Inventors: Tulasi Kodali, Plainfield, NJ (US); D J Vasant Ursal, Austin, TX (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 13/733,065

(22) Filed: Jan. 2, 2013

(65) Prior Publication Data
US 2013/0238590 A1   Sep. 12, 2013

Related U.S. Application Data

(60) Provisional application No. 61/609,644, filed on Mar. 12, 2012, provisional application No. 61/609,684, filed on Mar. 12, 2012, provisional application No. 61/609,698, filed on Mar. 12, 2012, provisional application No. 61/621,405, filed on Apr. 6, 2012, provisional application No. 61/659,843, filed on Jun. 14, 2012, provisional application No. 61/659,877, filed on Jun. 14, 2012.

(51) Int. Cl.
*G06F 7/00* (2006.01)
*G06F 17/30* (2006.01)
*G06F 21/60* (2013.01)
*G06F 21/62* (2013.01)
(Continued)

(52) U.S. Cl.
CPC ...... *G06F 17/30318* (2013.01); *G06F 17/3087* (2013.01); *G06F 17/30289* (2013.01); *G06F 17/30607* (2013.01); *G06F 17/30864* (2013.01); *G06F 21/604* (2013.01); *G06F 21/6227* (2013.01); *G06F 21/6236* (2013.01); *H04L 63/101* (2013.01); *H04L 63/20* (2013.01); *G06F 2221/2119* (2013.01); *G06F 2221/2141* (2013.01)

(58) Field of Classification Search
CPC .................... G06F 17/30607; G06F 17/30864
USPC ........................................ 707/792, 709, 741
See application file for complete search history.

(56) References Cited

U.S. PATENT DOCUMENTS 6,609,123 B1   8/2003   Cazemier
7,689,580 B2   3/2010   Wang et al.
(Continued)

FOREIGN PATENT DOCUMENTS

EP   2270725   1/2011

*Primary Examiner* — Usmaan Saeed
*Assistant Examiner* — Brian E. Weinrich
(74) *Attorney, Agent, or Firm* — Tucker Ellis LLP

(57) ABSTRACT

Systems and methods for providing an enterprise crawl and search framework are described, wherein the system includes features such as use with middleware and enterprise application environments, pluggable security, search development tools, user interfaces, and governance. In accordance with an embodiment, the system includes an enterprise crawl and search framework which abstracts an underlying search engine, provides a common set of application programming interfaces for developing search functionalities, and allows the framework to serve as an integration layer between one or more enterprise search engine and one or more enterprise application. A computing environment can be used to display an administration interface for use in administering the framework.

16 Claims, 8 Drawing Sheets

(51) Int. Cl.
*H04L 29/06* (2006.01)
*G06F 15/16* (2006.01)

(56) References Cited

U.S. PATENT DOCUMENTS

| | | | |
|---|---|---|---|
| 7,693,897 B2 * | 4/2010 | Bugir et al. | 707/792 |
| 7,769,752 B1 | 8/2010 | Turner | |
| 7,966,369 B1 | 6/2011 | Briere | |
| 8,176,083 B2 * | 5/2012 | Vossen et al. | 707/796 |
| 8,266,150 B1 * | 9/2012 | Lin et al. | 707/741 |
| 8,621,085 B2 * | 12/2013 | Trost et al. | 707/792 |
| 2001/0034733 A1 | 10/2001 | Prompt | |
| 2002/0107957 A1 * | 8/2002 | Zargham et al. | 709/224 |
| 2003/0217034 A1 | 11/2003 | Shutt | |
| 2004/0064447 A1 | 4/2004 | Simske | |
| 2005/0027796 A1 | 2/2005 | San Andres | |
| 2005/0149496 A1 | 7/2005 | Mukherjee et al. | |
| 2006/0112130 A1 | 5/2006 | Lowson | |
| 2006/0200556 A1 | 9/2006 | Brave et al. | |
| 2006/0277166 A1 * | 12/2006 | Vogler-Ivashchanka et al. | 707/999.003 |
| 2007/0016604 A1 | 1/2007 | Murthy et al. | |
| 2007/0130112 A1 | 6/2007 | Lin | |
| 2007/0130126 A1 | 6/2007 | Lucovsky | |
| 2007/0208744 A1 | 9/2007 | Krishnaprasad et al. | |
| 2007/0226242 A1 * | 9/2007 | Wang et al. | 707/999.102 |
| 2007/0266384 A1 | 11/2007 | Labrou | |
| 2007/0277110 A1 | 11/2007 | Rogers | |
| 2008/0082573 A1 * | 4/2008 | Fish et al. | 707/999.102 |
| 2008/0114628 A1 * | 5/2008 | Johnson et al. | 705/7 |
| 2008/0263462 A1 | 10/2008 | Mayer-Ullmann et al. | |
| 2008/0275844 A1 | 11/2008 | Buzsaki | |
| 2008/0281824 A1 * | 11/2008 | Rangadass et al. | 707/999.008 |
| 2008/0301562 A1 | 12/2008 | Berger | |
| 2009/0106207 A1 | 4/2009 | Solheim | |
| 2009/0112844 A1 | 4/2009 | Oro | |
| 2009/0222465 A1 | 9/2009 | Bernard | |
| 2010/0114947 A1 | 5/2010 | Eftekhari | |
| 2010/0205160 A1 * | 8/2010 | Kumar et al. | 707/696 |
| 2010/0319067 A1 | 12/2010 | Mohanty et al. | |
| 2010/0325569 A1 | 12/2010 | King et al. | |
| 2011/0077936 A1 * | 3/2011 | Arumugam et al. | 704/9 |
| 2011/0125764 A1 | 5/2011 | Carmel | |
| 2011/0191312 A1 | 8/2011 | Gutlapalli et al. | |
| 2011/0258199 A1 | 10/2011 | Oliver | |
| 2011/0270820 A1 * | 11/2011 | Agarwal | 707/709 |
| 2012/0259927 A1 | 10/2012 | Lockhart | |
| 2013/0061174 A1 | 3/2013 | Buchanan | |
| 2013/0073536 A1 | 3/2013 | Fedorynski | |
| 2013/0073570 A1 | 3/2013 | Joshi et al. | |

* cited by examiner

US 9,286,337 B2

SYSTEM AND METHOD FOR SUPPORTING HETEROGENEOUS SOLUTIONS AND MANAGEMENT WITH AN ENTERPRISE CRAWL AND SEARCH FRAMEWORK

CLAIM OF PRIORITY

This application claims the benefit of priority to U.S. Provisional Patent Application No. 61/609,644, titled "SYSTEM AND METHOD FOR PROVIDING AN ENTERPRISE CRAWL AND SEARCH FRAMEWORK", filed Mar. 12, 2012; U.S. Provisional Patent Application No. 61/609,684, titled "SYSTEM AND METHOD FOR PROVIDING AN ENTERPRISE CRAWL AND SEARCH FRAMEWORK", filed Mar. 12, 2012; U.S. Provisional Patent Application No. 61/609,698, titled "SYSTEM AND METHOD FOR PROVIDING AN ENTERPRISE CRAWL AND SEARCH FRAMEWORK", filed Mar. 12, 2012; U.S. Provisional Patent Application No. 61/621,405, titled "SYSTEM AND METHOD FOR PROVIDING AN ENTERPRISE CRAWL AND SEARCH FRAMEWORK", filed Apr. 6, 2012; U.S. Provisional Patent Application No. 61/ 659,843, titled "SYSTEM AND METHOD FOR PROVIDING AN ENTERPRISE CRAWL AND SEARCH FRAMEWORK USER INTERFACE", filed Jun. 14, 2012; and U.S. Provisional Patent Application No. 61/ 659,877, titled "SYSTEM AND METHOD FOR PROVIDING AN ENTERPRISE CRAWL AND SEARCH FRAMEWORK SECURITY", filed Jun. 14, 2012; each of which above applications are herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

Embodiments of the invention are generally related to enterprise applications, and to systems and methods for providing an enterprise crawl and search framework, including features such as use with middleware and enterprise application environments, pluggable security, search development tools, user interfaces, and governance.

BACKGROUND

Enterprise resource planning (ERP) or enterprise applications are commonly used by larger companies and organizations to run important aspects of their business. A typical enterprise application environment may include a database of business content, combined with end-user applications such as customer relationship management (CRM), human capital management (HCM), and business intelligence (BI).

Examples of such environments include Oracle E-Business Suite, and Oracle Fusion Applications, each of which are designed for handling complex business tasks within a large organization.

Organizations have become increasingly interested in greater integration of their business content with their business processes, including the use of transaction processing systems or application servers, such as Oracle WebLogic or Oracle Fusion Middleware, to deliver a higher quality of service in today's increasingly complex business environment. Such organizations can benefit from a richer search experience within their enterprise, which in turn requires rethinking traditional search methodologies. For example, since those company employees seeking particular information are also likely to have the best knowledge regarding their particular situation, it is important that they can obtain the information within that context. These are the general areas that embodiments of the invention are intended to address.

SUMMARY

In accordance with various embodiments, described herein are systems and methods for providing an enterprise crawl and search framework, including features such as use with middleware and enterprise application environments, pluggable security, search development tools, user interfaces, and governance.

As described herein, in accordance with an embodiment, the system includes an enterprise crawl and search framework which abstracts an underlying search engine, provides a common set of application programming interfaces for developing search functionalities, and allows the framework to serve as an integration layer between one or more enterprise search engine and one or more enterprise application. A computing environment can be used to display an administration interface for use in administering the framework.

DETAILED DESCRIPTION

Figure 1:
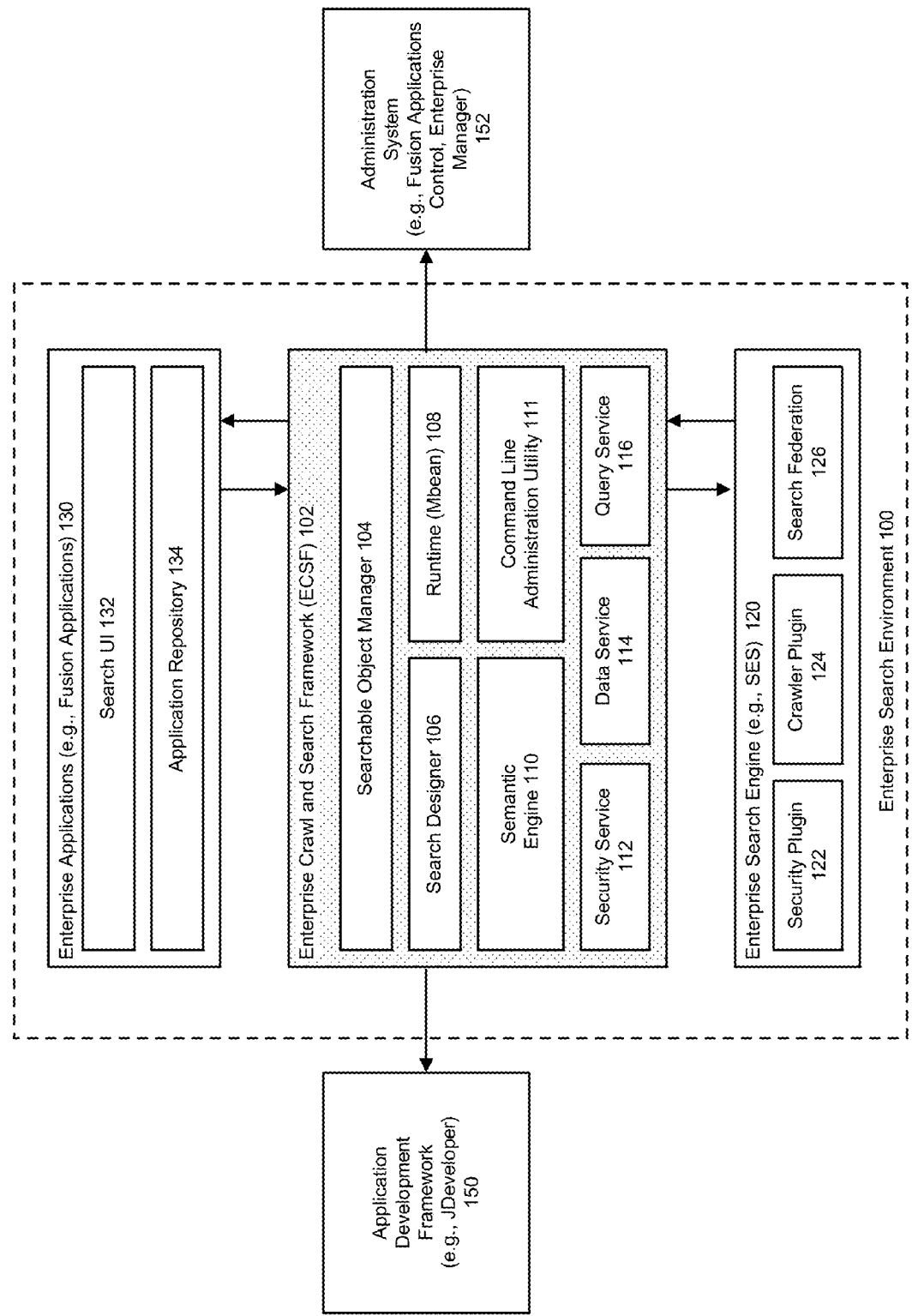
FIG. 1 illustrates an enterprise search environment including an enterprise crawl and search framework, in accordance with an embodiment.

As described above, organizations have become increasingly interested in greater integration of their business content with their business processes, including the use of transaction processing systems or application servers, to deliver a higher quality of service in today's increasingly complex business environment.

In particular, today's enterprise search specialists are looking to several important aspects of enterprise searching for use with their systems, including:

Visibility into the search engine process, which requires that the search engine not only log search activity, but also provide on-board reporting of user interaction.

Greater control of the search process, which enables information technology and business analysts to control and bias the search algorithm when necessary, including the use of relevance weightings for particular classes of content, and determining how host repositories should be indexed.

Improved delivery of search solutions to end-users, including the use of flexible templates for quickly building and rebuilding search experiences, and management dashboards that enable administrators to write and test business rules, relevance weighting profiles, and the indexing process.

Scalability in the search engine architecture, including the ability to scale the architecture using low-cost hardware.

Search engine security, including the ability to perform security checks in the search engine at runtime (when a set of results is queried), at index time (while the indexer crawls the data source), and/or upon a user's search query at execution time, to ensure the user see only that to which they are entitled.

To address this, in accordance with an embodiment, described herein are systems and methods for providing an enterprise crawl and search framework (ECSF), including features such as use with middleware and enterprise application environments, pluggable security, search development tools, user interfaces, and governance.

In accordance with an embodiment, the enterprise crawl and search framework can be used with environments such as Oracle Fusion Applications and/or Oracle WebLogic application server, or other enterprise application and computing environments, to consolidate business content information, and enable transactional search in a business context.

In accordance with an embodiment, the enterprise crawl and search framework includes an open architecture that supports different types of search engine in a plug-and-play manner, e.g., the use of Oracle Secure Enterprise Search (SES) or another open source or proprietary search engine. An administrator can add, define, configure and change search engines; define repositories to be supported; and administer external repositories, such as defining their location, defining and configuring connectors, indexing external data, and defining parameters related to federated search.

In accordance with an embodiment, the enterprise crawl and search framework can support features such as searching across different objects that have 1:1,1:M, M:1 or M:M relationships with each other, as defined by the organization's business process; and the use of searchable objects, which allow users to control which objects can be exposed and made searchable.

In accordance with an embodiment which uses Fusion Applications, the enterprise crawl and search framework can be provided as part of an integrated environment that includes the framework itself; one or more search engines that provides the fundamental search capability that includes indexing, querying, and security; and a source system, such as a relational database, which stores searchable business content or other information.

In accordance with various embodiments described herein, some of the features and advantages of the enterprise crawl and search framework include:

Transparent integration of enterprise applications (e.g., Fusion Applications) with search engines, which minimizes development time and maximizes the user experience with search.

Code reuse, through the use of a well designed set of abstract classes, to reduce long design cycles.

Basic platform for developing search, which helps developers to grasp the conceptual flow of work easily.

Centralized process and control mechanism, which enhances search functionality.

Basic search functionality, which allows querying based on keyword and search categories.

Advanced search functionality, which allows querying based on keyword, search category, and attribute filters.

Faceted navigation, which allows filtering of search results based on attributes of business objects. For example, users can navigate a search result set based on a set of predefined facets, or dimensions; the system returns a list of facets and their associated set of available values with the search result; users can select a value for each facet, which is then submitted with the search query in order to narrow down the result set.

Actionable results, which are search results with action links associated with the searchable objects. From the search results, users can either go straight to the page displaying the record they selected, or they can invoke a specific task on a search result.

Saved searches, which allows saved search criteria for later use. Users can create new saved search entries, edit and delete existing saved search entries, and retrieve user-specified or public saved search entries.

File attachments, which allow the crawling of attachments associated with transactional objects or records, such as Fusion Applications transactional objects or records.

Crawling of searchable objects that contain appropriate tags.

Crawling of tree structures, which supports search functionality on those source systems which contain data organized in a tree structure (e.g., Oracle Business Intelligence).

Search support for external data sources, which allows querying against search groups that contain non-framework data sources, such as wiki pages and blogs, and which can be directly crawled by the search engine.

ECSF Architecture

FIG. 1 illustrates an enterprise search environment 100 including an enterprise crawl and search framework 102, in accordance with an embodiment. As shown in FIG. 1, in accordance with an embodiment, the framework abstracts an underlying search engine, and provides a common set of application programming interfaces (APIs) for developing search functionalities, which allows the framework to serve as an integration layer between one or more enterprise search engines 120 (e.g., SES), and one or more enterprise applications 130 (e.g., Fusion Applications).

In accordance with an embodiment, the enterprise crawl and search framework includes a searchable object manager component 104, a search designer component 106, a runtime (e.g., managed bean, Mbean) component 108, a semantic engine component 110, a command line administration utility component 111, and one or more security service 112, data service 114, and query service 116. Each of the above components is described in further detail below.

In accordance with an embodiment, the enterprise crawl and search framework integrates with an enterprise search engine (e.g., SES), which provides capabilities for crawling and indexing metadata and objects exposed by the framework. In accordance with an embodiment, the enterprise search engine can include one or more security plugin component 122, crawler plugin component 124, and search federation component 126. Each of the above components is also described in further detail below.

In accordance with an embodiment, each enterprise application can include a search user interface (UI) 132, and an application repository 134.

In accordance with an embodiment, the enterprise search environment including the enterprise crawl and search framework can be accessed by a developer or another user using an application development framework 150 (e.g., Oracle JDeveloper); and by an administrator or another user using an administration system 152 (e.g., Oracle Fusion Applications Control, or Oracle Enterprise Manager).

Searchable Object Manager

In accordance with an embodiment, the searchable object manager component serves as a metadata manager, manages searchable objects, and provides the runtime interface for accessing these objects. At runtime, the searchable object manager loads searchable objects from persistent storage, validates the searchable object definitions, and provides the searchable objects to a crawlable factory component of the data service. In accordance with an embodiment, the searchable object manager is also responsible for the lifecycle management of the searchable objects, which allows administrators to deploy, customize, and enable or disable searchable objects via the command line administration utility component, or the administration system.

Search Designer

In accordance with an embodiment, the search designer component can be provided, e.g., as a page in JDeveloper, including an interface for defining metadata that describes the business objects to be indexed. A developer or another user can use this design interface to specify the security mechanism to be used to protect the data, and to define the searchable object search characteristics, which include advanced search, faceted navigation, and actionable results.

Semantic Engine

In accordance with an embodiment, the semantic engine component leverages the semantic information of searchable object definitions to create context around the search, by interpreting searchable object definitions with relation to the runtime user information during both crawl and query time.

Administration System

In accordance with an embodiment, the administration system can be provided, e.g., as an Enterprise Manager extension that provides a user interface for registering searchable objects in the framework schema of, e.g., the Fusion Applications database, as well as for administering the runtime parameters of the framework, the target search engine, and the configuration of parameters.

Command Line Administration Utility

In accordance with an embodiment, the command line administration utility component is a standalone command line interface that provides a user interface for registering searchable objects in the framework schema of, e.g., the Fusion Applications database. A developer, administrator, or other user can also use the command line administration utility to configure and administer the framework without external dependencies on the administration system.

Security Service

In accordance with an embodiment, the security service component is responsible for providing security information to the search engine. During query time, the security service retrieves the security keys of the user performing the search, and passes those keys to the search engine, where they are used to filter the query results.

In accordance with an embodiment, the security service server component is also invoked during crawl time, to add security information (access control lists, ACL) to data before inserting or creating indexes on the search engine. An ACL identifies the users who can access an associated object, and specifies the user's access rights to that object. The ACL values generated by the security service during crawl time should match the corresponding keys generated during query time.

In accordance with an embodiment, the security service component is implemented as a security engine with a plug-in interface. The security plug-in determines the format of the ACL keys. For custom security models, a new/custom security plug-in can be implemented. In accordance with an embodiment, the security service can use, e.g., Oracle Platform Security for Java, to authenticate users and call the security plug-in to retrieve security values for a given searchable object.

Data Service

In accordance with an embodiment, the data service component is the primary data interface between the enterprise crawl and search framework and the search engine. In accordance with an embodiment, the data service can use a proprietary Really Simple Syndication (RSS) feed format. In addition to supporting the flow of metadata between the framework and the search engine, the data service can support attachments, batching, and error handling.

In accordance with an embodiment, the data service authenticates each search engine crawl request by using, e.g., Platform Security for Java, to validate the user credentials and permissions for crawling the data source. A crawlable factory component, which is part of the data service, determines how searchable objects are broken down, and manages the construction of RSS feeds to the search engine.

Query Service

In accordance with an embodiment, the query service component provides a search interface for the enterprise application's search user interface (UI), and handles all search requests. In accordance with an embodiment, the query service performs query rewrite, parameter substitution, and other preprocessing operations, before invoking the underlying configured search engine. Search results are also serviced via this service. Hooks can be provided to preprocess and postprocess data, which facilitates the capability to filter search results.

Search Engine

In accordance with an embodiment, the search engine component (e.g., SES) enables a secure, uniform search across multiple enterprise repositories. The enterprise crawl and search framework integrates with the search engine to provide full-text search functionality in enterprise applications (e.g., Fusion Applications).

Security Plug-in

Some search engines, such as SES, provide an API for writing security plug-ins or connectors, e.g., in Java, which allows a developer to provide a security plug-in to meet their requirements. In accordance with an embodiment, the enterprise crawl and search framework can interface with this security plug-in. The security plug-in invokes the security service to retrieve keys, to which the user has access, for filtering the results that are delivered to the query service. In accordance with an embodiment, a proxy user must be set up on the search engine in order to invoke the security service, and must have security privileges for the enterprise applications (e.g., Fusion Applications).

Crawler Plug-in

In accordance with an embodiment, the crawler plug-in component is a search engine module that implements the modified RSS feed format between the enterprise crawl and search framework and the search engine. In accordance with an embodiment, the crawler plug-in component deserializes data communicated by the framework, via the data service component, and interfaces with the search engine components that create the indexes.

Search Federation

In accordance with an embodiment, the search federation component provides support for the user of federated search engine instances.

Figure 2:
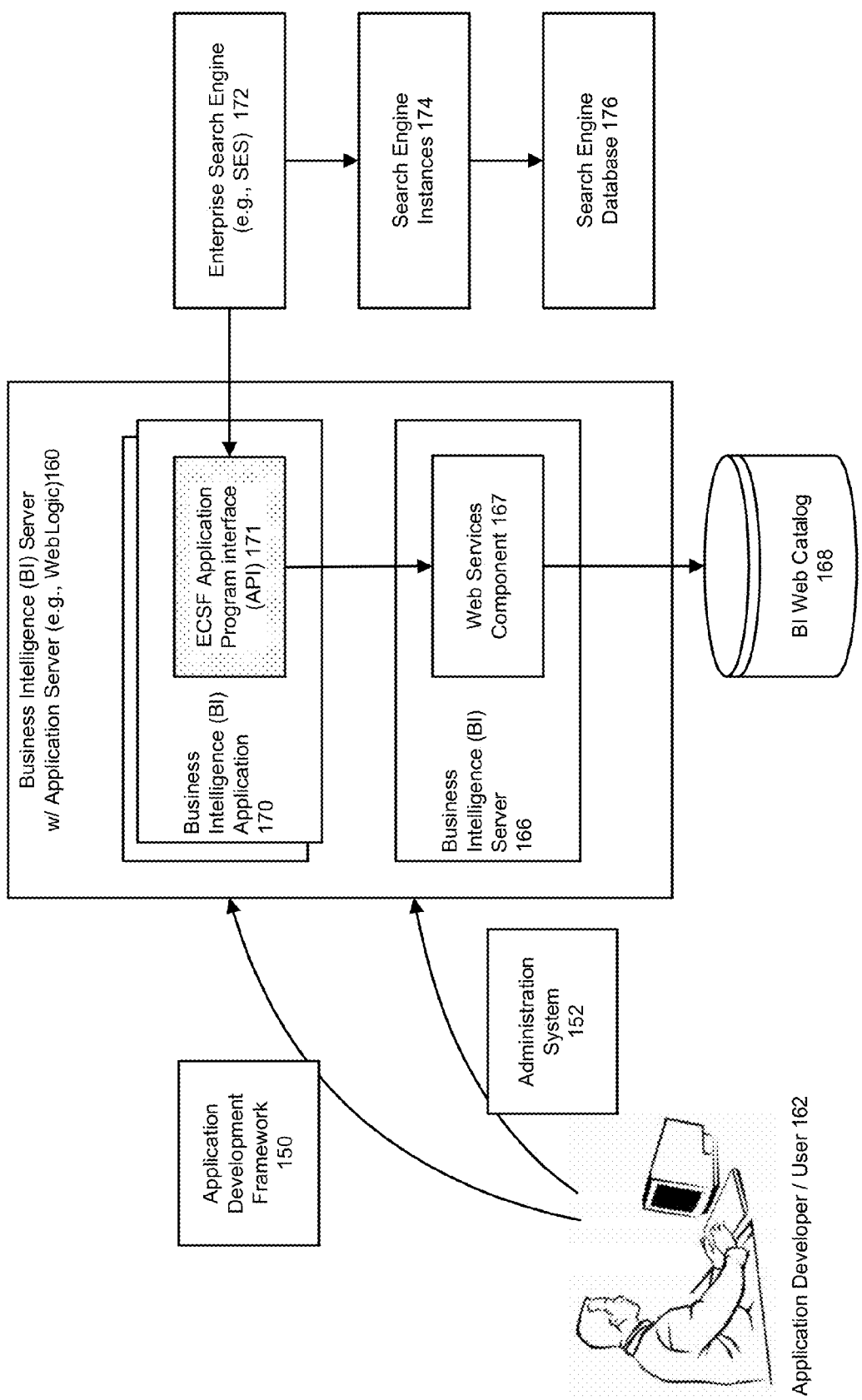
FIG. 2 illustrates an enterprise resource planning or enterprise application environment which includes an enterprise crawl and search framework, in accordance with an embodiment.

FIG. 2 illustrates an enterprise resource planning or enterprise application environment which includes an enterprise crawl and search framework, in accordance with an embodiment. It will be evident that the environment illustrated in FIG. 2 is provided merely as an illustrative example of the type of environment that can utilize various embodiments of the invention, and that, in accordance with other embodiments, different environments can be used.

As shown in FIG. 2, in accordance with an embodiment, a business intelligence (BI) server environment 160, such as an Oracle Business Intelligence environment using WebLogic application server, can include a BI server 166, and a web services component 167, that provides access to a BI web catalog of business content, data, or other information 172.

In accordance with an embodiment, one or more BI applications 170 can include an enterprise crawl and search framework API 171, which allows a developer or other user 162 using an application development framework and/or administration system, to configure the BI application(s) to take advantage of the enterprise crawl and search framework, including leveraging the enterprise search engine 172, search instances 174, and search engine database 176, to provide full-text search functionality across the applications.

Support for Heterogeneous Solutions and Management

In accordance with an embodiment, a system including the enterprise crawl and search framework can include support for heterogeneous solutions and management.

Figure 3:
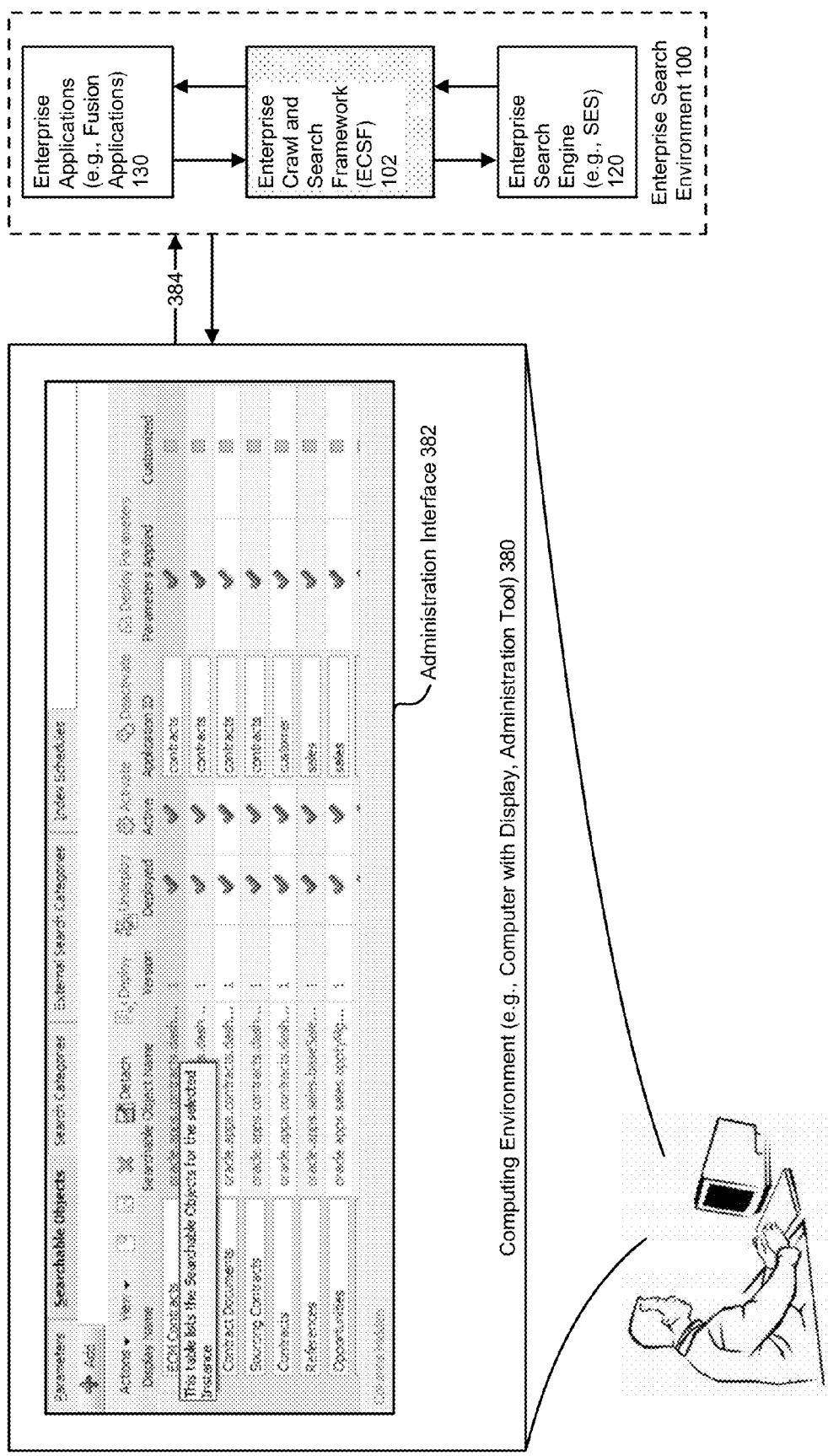
FIG. 3 illustrates an administration tool, for use in supporting heterogeneous solutions and management in an enterprise crawl and search framework, in accordance with an embodiment.

FIGS. 3-7 illustrate an administration tool, for use in supporting heterogeneous solutions and management in an enterprise crawl and search framework, in accordance with an embodiment. As shown in FIG. 3, in accordance with an embodiment, a computing environment 380 (e.g., a computer with a display and an administration tool, such as a Fusion Applications Control or an Enterprise Manager interface), can be used to display an administration interface 382.

In accordance with an embodiment, the administration interface can be used for configuring and administering the ECSF runtime server, managing the searchable object lifecycle, and synchronizing with the enterprise search engine (e.g., SES). ECSF also provides support for a command line administration option. The ECSF Command Line Administration Utility offers a command line interface, and has no external dependencies on products such as Enterprise Manager. An administrator can administer search by managing data sources and schedules and modifying data sources. In accordance with an embodiment, a developer, administrator or other user 370 can perform the following procedures to administer search:

Some enterprise applications (e.g., Oracle Fusion Customer Relationship Management, Oracle Fusion Human Capital Management, and Oracle Fusion Supply Chain Management product families) each has their own set of seeded searchable objects that are packaged into its corresponding search application. For example, the seeded searchable objects for Fusion Customer Relationship Management are packaged in the Fusion Customer Relationship Management search application.

Manage Index Schedules: An administrator or other user can perform the following tasks to manage index schedules:

Associate the Searchable Objects with Index Schedules: Associating searchable objects with an index schedule adds the objects to that index schedule. An administrator or other user can associate each searchable object with one index schedule.

Deploy the Index Schedules: Deploying index schedules pushes them to the enterprise search engine (e.g., SES) instance.

Start the Index Schedules: Starting an index schedule initiates the crawling and indexing of data.

Stop Index Schedules: Stopping an index schedule that has been started aborts the index process.

Disassociate Searchable Objects from Index Schedules: Disassociating a searchable object from an index schedule removes it from that index schedule and makes it available to be added to another index schedule.

Start Full Indexing: Full indexing is the process by which the search engine creates indexes from all crawled and indexable documents for a particular data source. In contrast, incremental indexing builds indexes on top of existing indexes.

Undeploy Index Schedules: Undeploying an index schedule removes it from the search engine instance. Only deployed index schedules can be undeployed.

Delete Index Schedules: Deleting an index schedule disassociates it from the search engine instance and removes its corresponding record, e.g., from the ECSF_INDEX_SCHEDULE table in the Fusion Applications database Change the Association of Searchable Objects with Search Categories: Changing the association of searchable objects with a search category disassociates the searchable objects from the search category and or associates additional searchable objects with the search category.

Rename Search Categories: Renaming a search category changes the name of the search category.

Delete Search Categories: Deleting a search category disassociates it from the search engine instance and removes its corresponding record, e.g., from the ECSF-_SEARCH_INDEX_GROUP table in the Fusion Applications database.

Make External Search Categories Available for Federated Search: External search categories are the registered search engine data source groups that contain external data sources (that is, data sources created using, e.g. SES administration). External data sources are not registered in the ECSF_SEARCH_INDEX_OBJECT table. They include data sources such as Intranet, mail, database, and federated data sources Delete External Search Categories: An administrator or other user can delete individual external categories once they are imported, e.g., into the Fusion Applications database. Deleting an external search category removes its corresponding record, and will make it unavailable for querying.

Modify the Display Name of Deployed Searchable Objects: An administrator or other user can change a deployed searchable object's display name and application ID without first having to deactivate and undeploy the searchable object Undeploy Searchable Objects: Undeploying searchable objects from the search engine instance makes the objects unavailable for the search engine instance to crawl. While undeployed, the searchable object is still associated with the search engine instance record and can be redeployed to the physical engine. When a searchable object is undeployed, any association to a search category or index schedule is removed.

Unregister Searchable Objects: Unregistering searchable objects removes the searchable object records, e.g., from the Fusion Applications database. Using Fusion Applications Control, an administrator or other user can remove records of searchable objects from the Fusion Applications database.

Modify Search Application Service Component Instance Parameters: An administrator or other user can modify the Search Application Service Component instance parameters to edit the query web service reference name and activate or deactivate the search application.

Modify the Title, Body, Keyword, and Action Title of Searchable Objects: An administrator or other user can customize searchable objects by changing the title, body, keywords, and search result action title using Fusion Applications Control.

Make New Searchable Objects Available for Search: New searchable objects are objects in addition to the set of transactional objects that are available out of the box.

The above-described examples of administrative procedures are provided for purposes of illustration. In accordance with other embodiments, other types of administrative procedures can also be provided.

Figure 4:
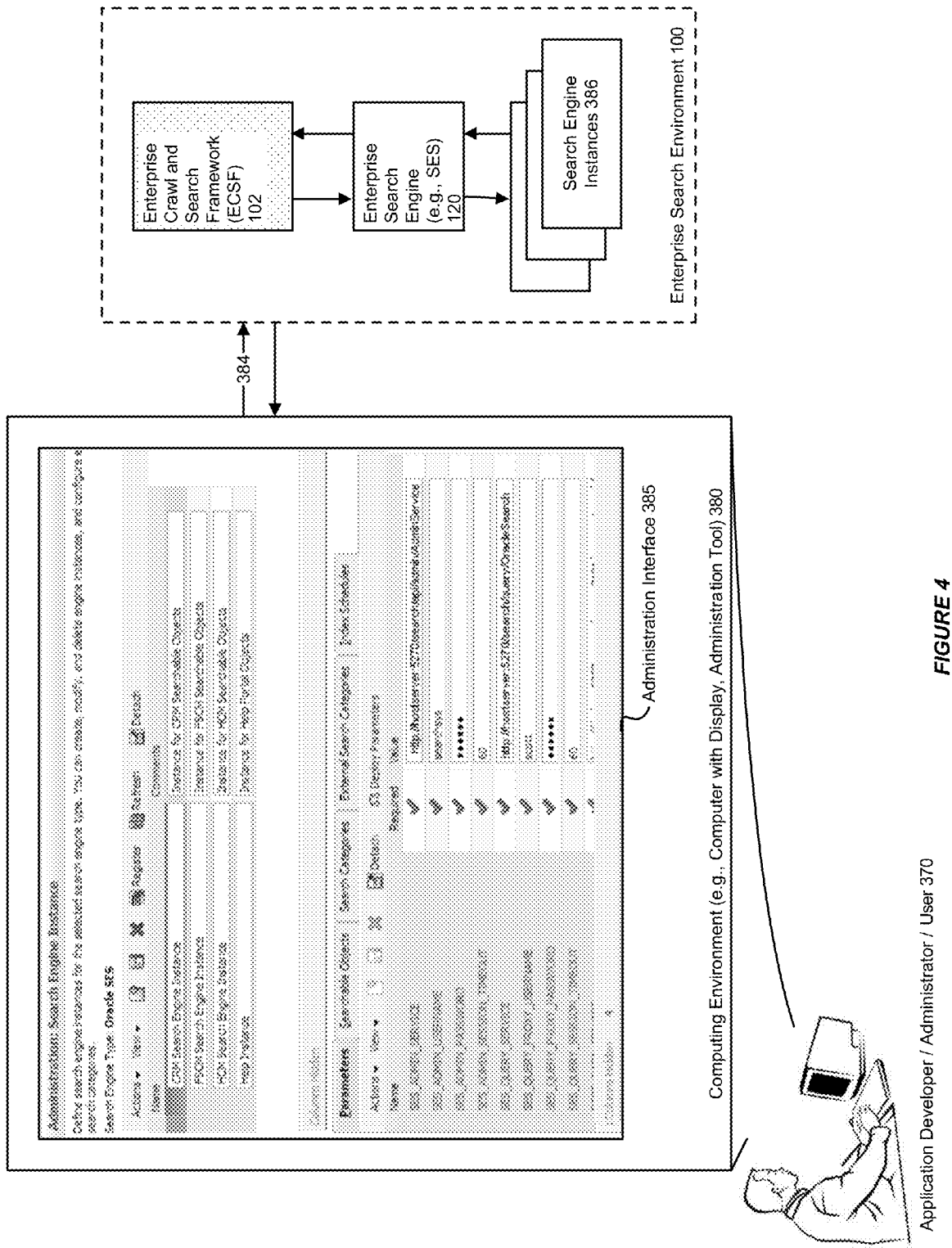
FIG. 4 illustrates another example of an administration tool for use in managing an enterprise crawl and search framework, in accordance with an embodiment.

FIG. 4 illustrates another example of an administration tool for use in managing an enterprise crawl and search framework, in accordance with an embodiment. As shown in FIG. 4, in accordance with an embodiment, the administration interface 385 can be used to configure parameters associated with search engine instances 386.

Figure 5:
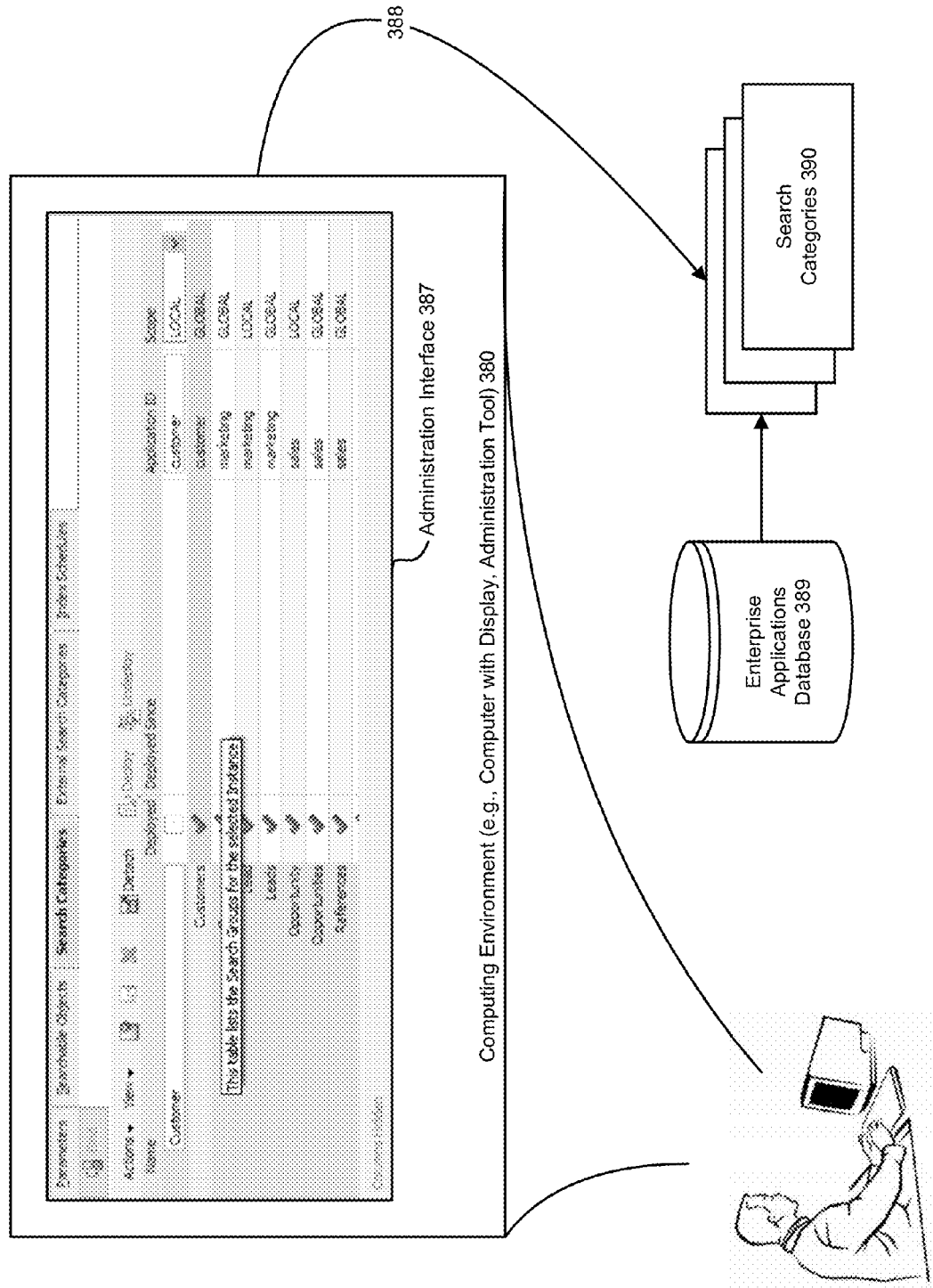
FIG. 5 illustrates another example of an administration tool for use in managing an enterprise crawl and search framework, in accordance with an embodiment.

FIG. 5 illustrates another example of an administration tool for use in managing an enterprise crawl and search framework, in accordance with an embodiment. As shown in FIG. 5, in accordance with an embodiment, the administration interface 387 can be used to configure 388 search categories 390 associated with an enterprise applications database 389.

Figure 6:
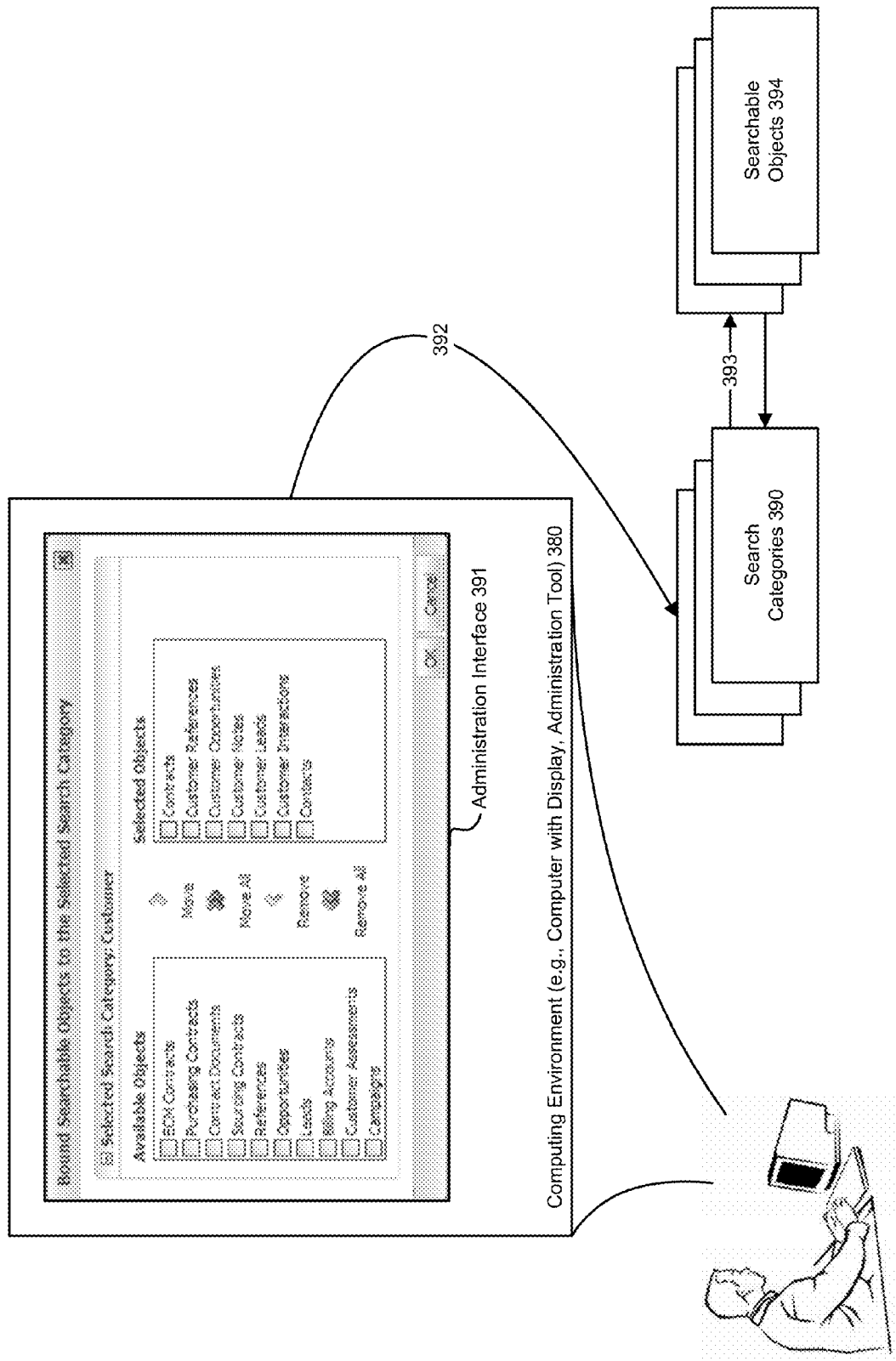
FIG. 6 illustrates another example of an administration for use in managing an enterprise crawl and search framework, in accordance with an embodiment.

FIG. 6 illustrates another example of an administration for use in managing an enterprise crawl and search framework, in accordance with an embodiment. As shown in FIG. 6, in accordance with an embodiment, the administration interface 391 can be used to configure 392 that searchable objects 394 be bound 393 to search categories 390.

Figure 7:
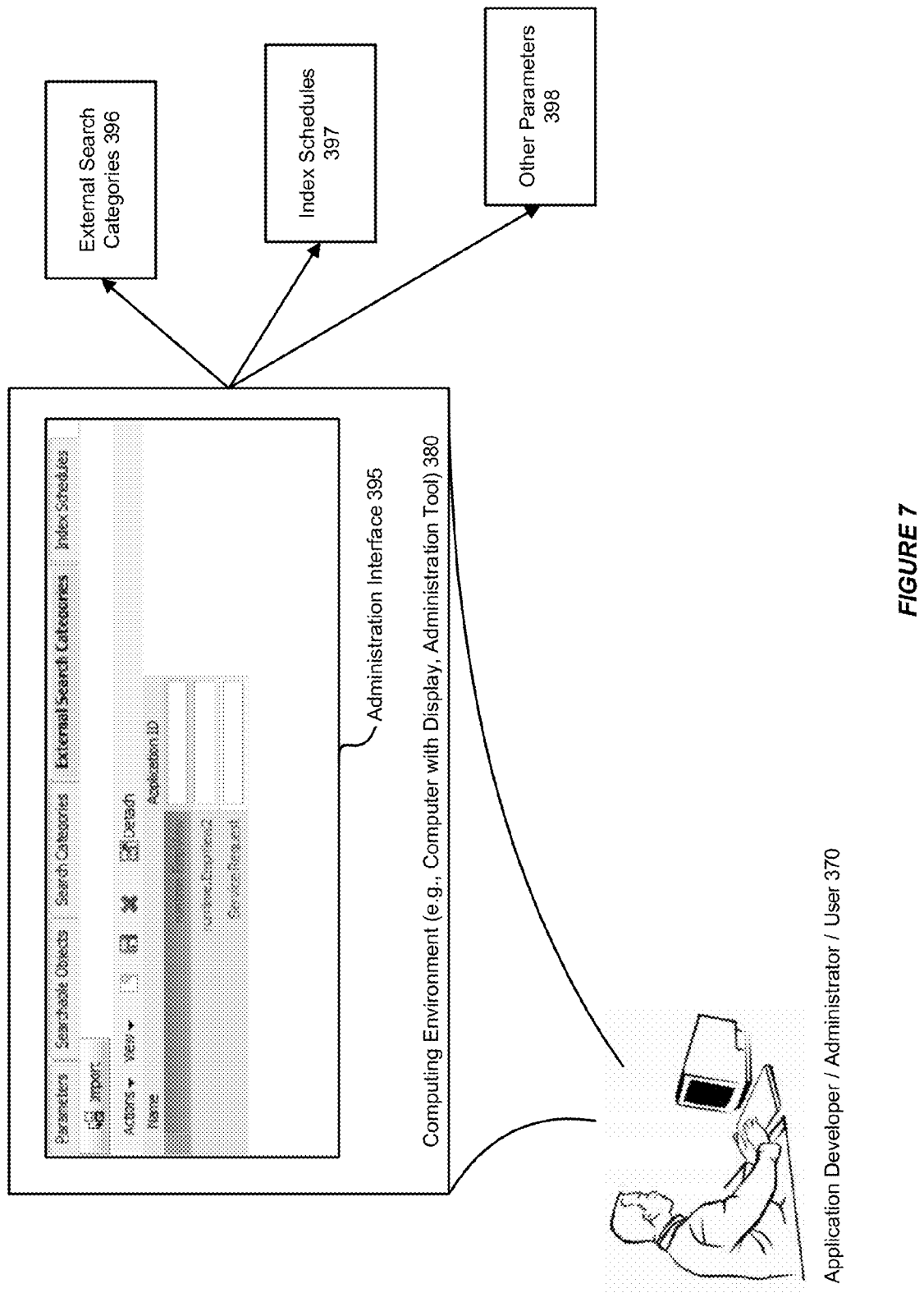
FIG. 7 illustrates another example of an administration tool for use in managing an enterprise crawl and search framework, in accordance with an embodiment.

FIG. 7 illustrates another example of an administration tool for use in managing an enterprise crawl and search framework, in accordance with an embodiment. As shown in FIG. 7, in accordance with an embodiment, the administration interface 395 can be used to configure other parameters associated with the ECSF and search engine instances, such as external search categories 396, index schedules 397, and other parameters 398.

Figure 8:
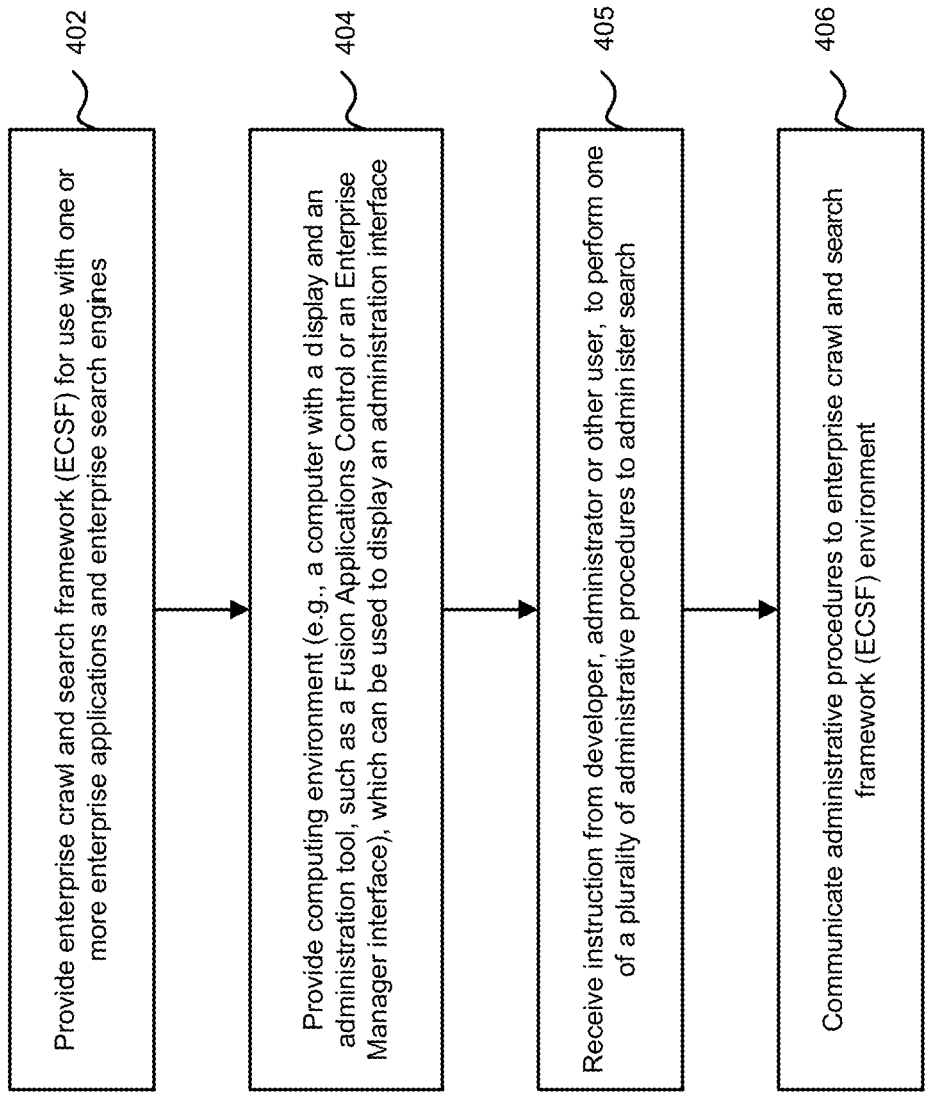
FIG. 8 illustrates a method of providing an administration tool, for use in supporting heterogeneous solutions and management in an enterprise crawl and search framework, in accordance with an embodiment.

FIG. 8 illustrates a method of providing an administration tool, for use in supporting heterogeneous solutions and management in an enterprise crawl and search framework, in accordance with an embodiment. As shown in FIG. 8, at step 402, an enterprise crawl and search framework (ECSF) is provided for use with one or more enterprise applications and enterprise search engines.

At step 404, a computing environment (e.g., a computer with a display and an administration tool, such as a Fusion Applications Control or an Enterprise Manager interface), is provided which can be used to display an administration interface.

At step 405, the system receives an instruction from developer, administrator or other user, to perform one of a plurality of administrative procedures to administer search.

At step 406, the user communicates administrative procedures to the enterprise crawl and search framework (ECSF).

The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a non-transitory storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art.

In particular, it will be evident that, although many of the examples described above illustrate the use of an enterprise crawl and search framework within an environment that includes an Oracle Fusion Applications enterprise application, and an Oracle Secure Enterprise Search enterprise search engine, in accordance with various embodiments, the enterprise crawl and search framework, and features and methods described can be used with other types of enterprise application, and other types of enterprise search engine.

The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A system for search framework management, comprising:

a computer including one or more microprocessors;

an enterprise crawl and search framework (ECSF), operating on the computer, which abstracts an underlying enterprise search engine, and serves as an integration layer between a plurality of instances of the underlying enterprise search engine and a plurality of enterprise applications, each enterprise application associated with a set of searchable objects; and an administration interface, displayed in a computing environment, for use in administering the ECSF framework, wherein the administering includes configuring and administering a runtime server associated with the ECSF framework, synchronizing the runtime server of the ECSF framework with the plurality of instances of the underlying enterprise search engine, managing a lifecycle of the set of searchable objects associated with a particular enterprise application, including binding the set of searchable objects to one or more search categories associated with a particular search engine instance, and importing one or more external search categories registered with a different search engine instance, to make the imported external search categories for direct search.

2. The system of claim 1, wherein the underlying enterprise search engine is an Oracle Secure Enterprise Search engine, and wherein the plurality of enterprise applications include one or more Oracle Fusion Applications.

3. The system of claim 1, wherein the administering further includes configuring parameters of the particular instance of the underlying enterprise search engine; and configuring the set of searchable objects associated with the particular enterprise application.

4. The system of claim 1, wherein the administering further includes creating new searchable objects.

5. A method for search framework management, comprising:

displaying, via a computing environment, an administration interface for use in administrating an enterprise crawl and search framework (ECSF) which abstracts an underlying enterprise search engine, and serves as an integration layer between a plurality of instances of the underlying enterprise search engine and a plurality of enterprise applications, each enterprise application associated with a set of searchable objects;

configuring and administering, via the administration interface, a runtime server associated with the ECSF framework;

synchronizing the runtime server of the ECSF framework with the plurality of instances of the underlying enterprise search engine;

managing a lifecycle of the set of searchable objects associated with a particular enterprise application, including binding the set of searchable objects to one or more search categories associated with a particular search engine instance; and importing one or more external search categories registered with a different search engine instance, to make the imported external search categories for direct search.

6. The method of claim 5, wherein the underlying enterprise search engine is an Oracle Secure Enterprise Search engine, and wherein the plurality of enterprise applications include one or more Oracle Fusion Applications.

7. The method of claim 5, wherein the external search categories are registered with a search engine data source group that contains external data sources.

8. The method of claim 7, wherein the external data sources include Intranet, mail, database, and federated data sources.

9. The method of claim 5, wherein the external search categories are registered with a search engine data source group that contains external data sources.

10. The method of claim 5, further comprising configuring parameters of the particular instance of the underlying enterprise search engine; and configuring the set of searchable objects associated with the particular enterprise application.

11. The method of claim 5, further comprising creating new searchable objects.

12. A non-transitory computer readable storage medium including instructions stored thereon which, when executed by a computer, cause the computer to perform the steps comprising:

displaying, via a computing environment, an administration interface for use in administrating an enterprise crawl and search framework (ECSF) which abstracts an underlying enterprise search engine, and serves as an integration layer between a plurality of instances of the underlying enterprise search engine and a plurality of enterprise applications, each enterprise application associated with a set of searchable objects;

configuring and administering, via the administration interface, a runtime server associated with the ECSF framework;

synchronizing the runtime server of the ECSF framework with the plurality of instances of the underlying enterprise search engine;

managing a lifecycle of the set of searchable objects associated with a particular enterprise application, including binding the set of searchable objects to one or more search categories associated with a particular search engine instance; and importing one or more external search categories registered with a different search engine instance, to make the imported external search categories for direct search.

13. The non-transitory computer readable storage medium of claim 12, wherein the underlying enterprise search engine is an Oracle Secure Enterprise Search engine, and wherein the plurality of enterprise applications include one or more Oracle Fusion Applications.

14. The non-transitory computer readable storage medium of claim 12, wherein the external search categories are registered with a search engine data source that contains external data sources.

15. The non-transitory computer readable storage medium of claim 12, further comprising configuring parameters of the particular instance of the underlying enterprise search engine; and configuring the set of searchable objects associated with the particular enterprise application.

16. The non-transitory computer readable storage medium of claim 12, further comprising creating new searchable objects.

* * * * *